United States Patent
Talyansky et al.

(10) Patent No.: US 9,384,287 B2
(45) Date of Patent: Jul. 5, 2016

(54) METHODS, APPARATUS, SYSTEMS AND COMPUTER READABLE MEDIA FOR USE IN KEYWORD EXTRACTION

(71) Applicants: Roman Talyansky, Haifa (IL); Vitaly Vainer, Kfar Saba (IL); Eyal Nathan, Reut (IL); Oleg Kossoy, Netanya (IL); Dmitry Khalatov, Yokneam-Illit (IL)

(72) Inventors: Roman Talyansky, Haifa (IL); Vitaly Vainer, Kfar Saba (IL); Eyal Nathan, Reut (IL); Oleg Kossoy, Netanya (IL); Dmitry Khalatov, Yokneam-Illit (IL)

(73) Assignee: SAP Portals Isreal Ltd., Ra'Anana (IL)

( * ) Notice: Subject to any disclaimer, the term of this patent is extended or adjusted under 35 U.S.C. 154(b) by 432 days.

(21) Appl. No.: 14/156,093

(22) Filed: Jan. 15, 2014

(65) Prior Publication Data

US 2015/0199438 A1 Jul. 16, 2015

(51) Int. Cl.
G06F 17/30 (2006.01)

(52) U.S. Cl.
CPC .... G06F 17/30867 (2013.01); G06F 17/30536 (2013.01); G06F 17/30542 (2013.01)

(58) Field of Classification Search
CPC .................. G06F 17/30867; G06F 17/30542; G06F 17/30536
USPC ........................................................ 707/730
See application file for complete search history.

(56) References Cited

U.S. PATENT DOCUMENTS

| | | | | |
|---|---|---|---|---|
| 5,675,819 A * | 10/1997 | Schuetze | ........... | G06F 17/30675 704/10 |
| 7,490,090 B2 | 2/2009 | Hijikata et al. | | |
| 7,493,330 B2 * | 2/2009 | Cubranic | .......... | G06F 17/30477 707/802 |
| 7,899,832 B2 * | 3/2011 | Abhyankar | ....... | G06F 17/30643 707/752 |
| 7,958,126 B2 * | 6/2011 | Schachter | ......... | G06F 17/30867 707/748 |
| 8,185,509 B2 | 5/2012 | Cras | | |
| 8,260,772 B2 | 9/2012 | Bolf et al. | | |
| 8,321,398 B2 | 11/2012 | Aumann et al. | | |
| 8,346,534 B2 | 1/2013 | Csomai et al. | | |
| 8,407,215 B2 | 3/2013 | Sheedy et al. | | |
| 8,538,965 B1 | 9/2013 | Talyansky et al. | | |
| 8,650,194 B2 | 2/2014 | Hu | | |
| 8,849,860 B2 * | 9/2014 | Ilyas | ................. | G06F 17/30914 707/791 |
| 2011/0119273 A1 * | 5/2011 | Abhyankar | ....... | G06F 17/30643 707/740 |
| 2011/0238598 A1 * | 9/2011 | Borowski | ............... | G06Q 99/00 705/500 |
| 2011/0268675 A1 * | 11/2011 | Ureneck | .................. | A61K 8/25 424/59 |
| 2012/0117092 A1 | 5/2012 | Stankiewicz et al. | | |
| 2012/0271589 A1 | 10/2012 | Nagano et al. | | |

(Continued)

OTHER PUBLICATIONS

Lott, Brian, "Survey of Keyword Extraction Techniques", Dec. 4, 2012, (cover 1pg. +1-10, 11 total pages).

(Continued)

*Primary Examiner* — Shahid Alam
(74) *Attorney, Agent, or Firm* — Buckley, Maschoff & Talwalkar LLC

(57) ABSTRACT

In one embodiment, a method includes: receiving data representing a plurality of corpora, each of the plurality of corpora including a set of documents; receiving data representing terms that appear in the corpora; for each one of the terms, determining a plurality of inverse document frequency values each associated with a respective one of the plurality of corpora; receiving data representing a subset of the terms that also appear in a document; for each term in the subset, determining a term frequency for the term in the document; and for each term in the subset, determining, an augmented term frequency-inverse document frequency value based on: (i) the term frequency, and (ii) the plurality of inverse document frequency values that were determined for the term in the subset.

17 Claims, 6 Drawing Sheets

(56) References Cited

U.S. PATENT DOCUMENTS

| | | |
|---|---|---|
| 2012/0303637 A1 | 11/2012 | Carmel et al. |
| 2013/0103664 A1 | 4/2013 | Heidasch |
| 2013/0124545 A1 | 5/2013 | Holmberg et al. |
| 2013/0238531 A1 | 9/2013 | Seidler et al. |
| 2014/0040297 A1 | 2/2014 | Ozonat et al. |

OTHER PUBLICATIONS

"Welcome to Wikipedia Main Page: the free encyclopedia", however the Wikipedia website and a portion of its content existed prior to 2014, download from http://en.wikipedia.rog/wiki/Main_Page on Jan. 10, 2014, 4pgs.

Bagad, V. S. et al. "Waveguide filter", from Wikipedia, the free encyclopedia, Mar. 23, 2012, download from https://en.wikipedia.org/w/index.php?title=Waveguide_filter&oldid=483576412, retrieved date Jun. 16, 2015, 8pgs.

Bagad, V. S. et al., "Waveguide filter", from Wikipedia, the free encyclopedia, Jan. 10, 2014, download from https://en.wikipedia.org/w/index.php?oldid=590104693, retrieved date Jun. 16, 2015, 27pgs.

\* cited by examiner

METHODS, APPARATUS, SYSTEMS AND COMPUTER READABLE MEDIA FOR USE IN KEYWORD EXTRACTION

BACKGROUND

Enterprises and/or other types of entities often create, collect and/or otherwise use natural language documents in the course of their operations.

It is often desired to generate keywords for some or all of the natural language documents created, collected and/or otherwise used by an enterprise.

One technique for generating keywords for natural language documents is referred to as keyword extraction. Keyword extraction is widely used in information retrieval, topic detection, automatic tagging of documents and many other tools and solutions.

One of the most popular approaches to extract keywords from natural language text is the tf-idf approach. A paper that discusses the tf-idf approach is Lott, Brian, "Survey of Keyword Extraction Techniques", which can be found at http://www.cs.unm.edu/~pdevineni/papers/Lott.pdf.

The tf-idf approach is based on word statistics. The word statistics includes word statistics on a document level and on a corpus (a set of documents) level. The tf-idf approach essentially makes two assumptions. The first assumption is that terms that appear more frequently in a document are more important in the document than terms that appear less frequently in the document. The number of occurrences of a term t in a document d is referred to as term frequency and is denoted as:

$$tf_d(t) \quad (1)$$

The second assumption is on the corpus level. This assumption states that terms that occur in fewer documents in the corpus are more important than terms that occur in more documents in the corpus. For example the word "the" occurs in almost all online CNN newspaper articles for the year 2013, and as might be predicted based on the second assumption, the word "the" is less important than terms that occur in fewer of the online CNN newspaper articles for the year 2013.

The importance of a word in a corpus is sometimes referred to herein as its semantic load. In view of the above, it may be said that the term "the" does not carry a significant semantic load in the online CNN newspaper articles for the year 2013. On the other hand, the word "software" occurs in fewer of the online CNN articles for the year 2013. Thus, it may be said that the word "software" carries more semantic load (than the word "the" carries) in the online CNN articles for the year 2013.

The second assumption in the tf-idf approach is formalized by determining of an inverse document frequency (idf) of a term in a corpus, based on the following definition:

$$idf_C(t) = \log\frac{|C|}{1 + |\{d \in C : t \text{ is in } d\}|} \quad (2)$$

where C refers to the corpus
t refers to the term and
d refers to a document in the corpus.

In the definition set forth above, it can be seen that the numerator will have a value equal to the number of documents in the corpus. The denominator will have a value equal to 1+the number of corpus documents that include the term. Thus, for a corpus of a given size, the inverse document frequency idf of a term in the corpus will decrease as the number of documents that are in the corpus and include that term increase.

After determining the term frequency, tf, of a term t in a document d, as well as the inverse document frequency, idf, of the term t in the corpus C, an tf-idf value of the term t in the document d in the corpus C, may be determined based on the following definition:

$$tf\text{-}idf_{d,C}(t) = tf_d(t) \cdot idf_C(t). \quad (3)$$

where C refers to the corpus
t refers to the term and
d refers to the document.

In the definition set forth above, the tf-idf value of a term t in a document d and a corpus C is equal to the product of the term frequency, tf, of the term in the document d and the inverse document frequency, idf, of the term t in the corpus C.

The keywords chosen for a document d will typically be the terms that have a high tf-idf value for the document d and corpus C.

DETAILED DESCRIPTION

Figure 1:
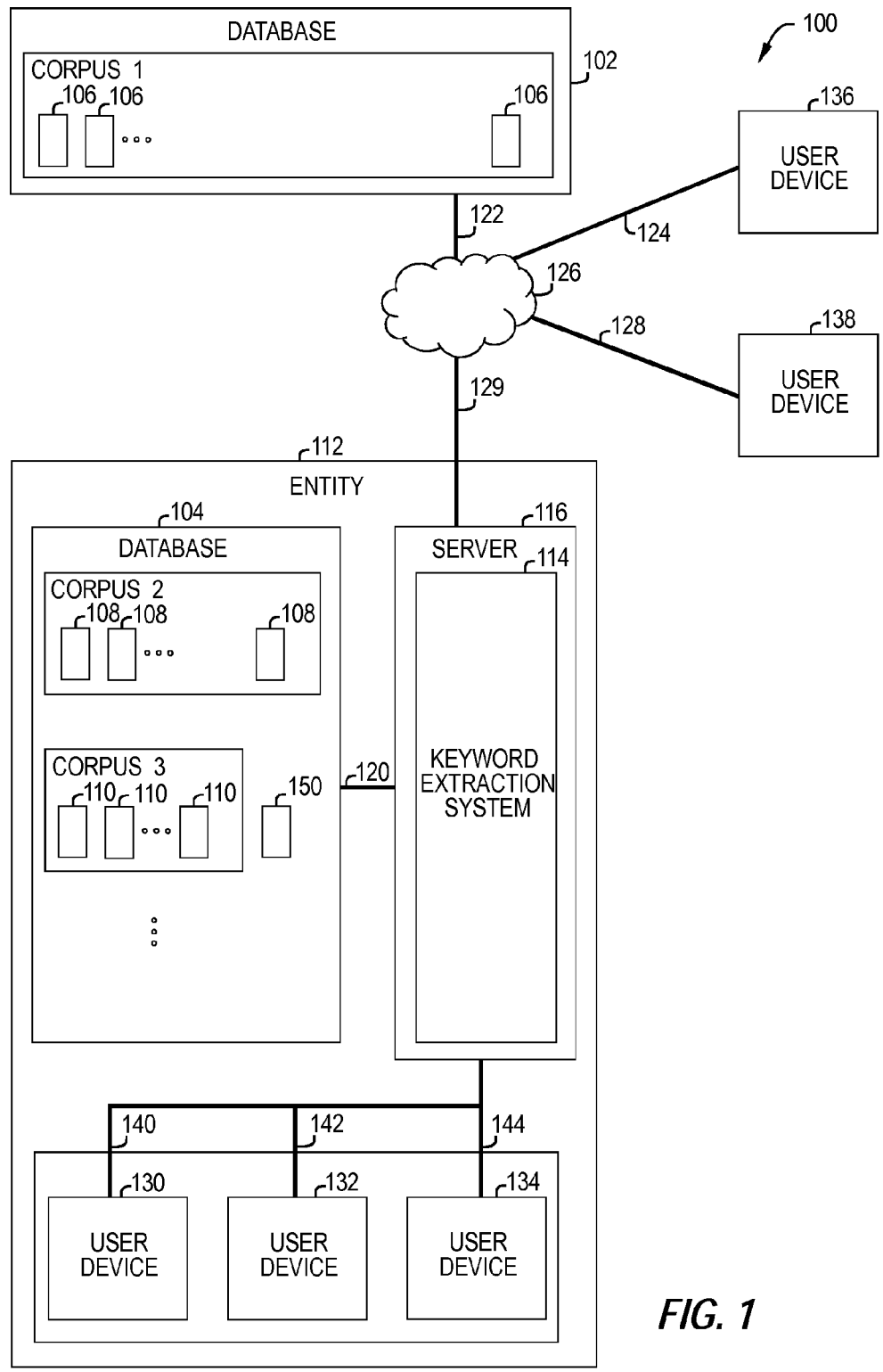
FIG. 1 is a block diagram of a system, in accordance with some embodiments.

Notwithstanding the benefit that is provided by the ability to identify a term as a keyword for a document in which the term appears, it has been determined that there are instances in which it is undesirable to identify a term as a keyword for a document in which the term appears.

Consider for example, a case in which a special term that relates to a new project, product or technology, e.g., "SAP Man", appears in every, or almost every, internal document produced within an enterprise (or within a group within the enterprise), over a particular period of time.

In such a case, the special term may have little semantic value with respect to such internal documents. In view of the above, it may be desirable to avoid the tendency to choose the special term as a keyword for such internal documents.

Such a term may hardly appear in a general corpus, e.g., WIKIPEDIA, which is large and captures statistics of many words and special terms. However, if a term hardly appears in a corpus, it will have a very high inverse document frequency value, idf value, in the corpus.

Consequently, if a general corpus has been chosen for determining the word statistics described above, and if the special term hardly appears in the general corpus, the special term may end up with a very high inverse document frequency value, and as a result, there may be a tendency to choose the special term as a keyword for each document in which it appears, including every, or almost every, internal document produced within the enterprise over the particular period of time.

One way to address the above would be to choose a set of internal documents of the enterprise (sometimes referred to herein as enterprise internal documents), e.g. a set of all emails of all employees of the enterprise, as the corpus. That way, the special keyword would not receive a very high inverse document frequency value, and as a result, there would not be a tendency to choose the special term as a keyword for every document in which it appears. For this reason, such a corpus is sometimes referred to as an enterprise specific corpus and said to be "tuned" for keyword extraction at the enterprise level.

However, a corpus made up of documents internal to an enterprise might not contain enough documents to capture reliable statistics for many words and other special terms that appear in a given language (e.g., English). Thus, a term that has little semantic value in a general corpus may be under observed in the enterprise specific corpus, thereby ending up with a very high inverse document frequency, and as a result, it may be chosen as a keyword for each enterprise internal document in which it appears.

Another way to address the above would be to choose a corpus that is tuned for keyword extraction at the level of an individual employee. Such a corpus may comprise a set of employee documents/emails (e.g., documents and emails that are created, received and/or otherwise used by the employee). There may be codenames and specialized terms that appear frequently in the individual employee specific corpus but are rare in the enterprise-specific corpus. However, an individual employee specific corpus is even smaller than the enterprise specific corpus.

Thus, the use of a domain specific corpus helps prevent the choosing of terms that frequently occur in the domain (sometimes referred to herein as "garbage" terms) as keywords for documents in the domain. However more specialized types of corpora are smaller than a general corpus and do not allow for the calculation of reliable term statistics. As a result, a term that has little semantic value in a general corpus may be under observed in the domain specific corpus, thereby ending up with a very high inverse document frequency and chosen as a keyword for each domain specific document in which it appears.

It would be desirable, to have the ability to help capture reliable statistics for many words and special terms in a language, as if a generic corpus is used. This would reduce the likelihood that a term with little semantic value in a general corpus and under observed in a domain specific corpus will end up chosen as a keyword for each domain specific document in which it appears. It would also be desirable to help prevent terms that frequently occur in a domain (i.e., "garbage" terms in the domain) from being chosen as keywords for documents in the domain in which they appear, as if a domain specific corpus is used. This would reduce the likelihood that a special term that appears in every, or almost every, internal document of an enterprise is chosen as a keyword for every such internal document in which it appears.

It has also been determined that if the number of documents in a corpus is relatively small, the log function in the determination of the inverse document frequency, idf, for a term in the corpus, may be too "aggressive", and may thereby decrease the accuracy of keyword extraction. For example, by using the log function, terms that occur in much different numbers of documents in the corpus, may end up with inverse document frequency values, idf values, that are almost identical to one another, and as a result, the inverse document frequency values, idf values, may not help differentiate a term that is more important from a term that is less important.

FIG. 1 is a block diagram of a system 100 that may be used to determine keywords for documents, in accordance with some embodiments.

In accordance with some embodiments, the system 100 has the ability to help capture reliable statistics for many words and special terms in a language, as if a generic corpus is used. This reduces the likelihood that a term with little semantic value in a general corpus and under observed in a domain specific corpus will end up chosen as a keyword for each domain specific document in which it appears. In accordance with some embodiments, the system also has the ability to help prevent terms that frequently occur in a domain (i.e., "garbage" terms in the domain) from being chosen as keywords for documents in the domain in which they appear, as if a domain specific corpus is used. This reduces the likelihood that a special term that appears in every, or almost every, internal document of an enterprise is chosen as a keyword for every such internal document in which it appears.

Briefly, and as will be further described below, in accordance with some embodiments, the above is provided by using a plurality of different types of corpora (e.g., general, enterprise-level and employee-level) to generate a plurality of inverse document frequency values for each term.

As will also be further described below, rather than determine a term frequency-inverse document frequency value, tf-idf value, for a term t in a document d and a corpus C based on an single inverse document frequency value associated with a single corpus, an augmented term frequency-inverse document frequency value, an augmented tf-idf value, is determined for the term t in the document d based on the plurality of inverse document frequency values, each of which is associated with a respective one of the plurality of different types of corpora.

Referring to FIG. 1, the system 100 includes a plurality of corpora, each including a set of documents. The corpora may be stored in one or more databases and/or anywhere else within the system.

For example, in accordance with some embodiments, the system includes one or more databases, e.g., databases 102-104. A first one of the databases, e.g., database 102, stores data representing a first corpus, CORPUS 1, which includes a first set of documents, represented in FIG. 1 by documents 106. A second one of the databases, e.g., database 104, stores data representing a second corpus, CORPUS 2, which includes a second set of documents, represented in FIG. 1 by documents 108. The second database 104 may also store data representing a third corpus, CORPUS 3, which includes a third set of documents, represented in FIG. 1 by documents 110.

The first database 102 may be a database operated by, and/or otherwise associated with, a data provider, such as, for example, WIKIPEDIA, and the first corpus, CORPUS 1, may be a general corpus that includes documents across a wide range of subjects. In some embodiments, for example, the first corpus, CORPUS 1, includes all documents available from wikipedia.org.

The second database 104 may be a database operated by, and/or otherwise associated with, an entity 112, e.g., an enterprise, and the second corpus, CORPUS 2, may be a corpus that is less general that the first corpus, CORPUS 1, and may include, in large part, internal documents of the entity. As used herein the phrase internal documents of the entity refers to documents that are created, received and/or otherwise used within the entity 112.

In some embodiments, the second corpus. CORPUS 2, consists of a set of all emails of all employees of the entity 112.

The third corpus, CORPUS 3, may be a corpus that is less general than the second corpus, CORPUS 2, and may include, in large part, internal documents of a group (which may be a single user) of the entity.

As used herein the phrase internal documents of a group of the entity refers to documents that are created, received and/or otherwise used within the group of the entity 112. In some embodiments, the third corpus. CORPUS 3, consists of a set of all documents used by a particular employee of the entity 112 and/or all emails of the particular employee.

The system 100 further includes a keyword extraction system 114, which receives data representing a plurality of documents and determines keywords for one or more of such documents. The keyword extraction system 114 may be part of a server 116 that is operated by, and/or otherwise associated with, an entity, e.g., the entity 112. One or more communication links, e.g., communication links 120-129, may couple the keyword extraction system 114 (or server 116) to the one or more databases, e.g., databases 102-104.

The system 100 may further include a plurality of devices, e.g., devices 130-138, operated by one or more users. One or more of such devices 130-138 (sometimes referred to herein as user devices) may comprise a desktop computer. One or more others of the user devices may comprise a laptop computer, a smart phone, and/or any other type of user device. One or more communication links, e.g., communication links 120-129, 140-144 may couple the user devices 130-138 to the keyword extraction system 114 (or server 116) and/or the databases 102-104.

As stated above, the corpora may be stored anywhere in the system. Thus, although each corpus in the corpora is shown stored in a database, one or more corpus of the corpora may be stored on one or more disks and/or other type(s) of device(s), without being stored in one or more databases.

As stated above, the database 104, the keyword extraction system 114 and the server 116 may be operated by, and/or otherwise associated with and entity 112. Of course, in some embodiments, the database 104, the keyword extraction system 114 and/or the server 116 will not be operated by, and/or otherwise associated with a single entity 112. In some embodiment, the database 104, the keyword extraction system 114 and/or the server 116 reside in a cloud, external the entity 112, e.g., AMAZON cloud.

Figure 2:
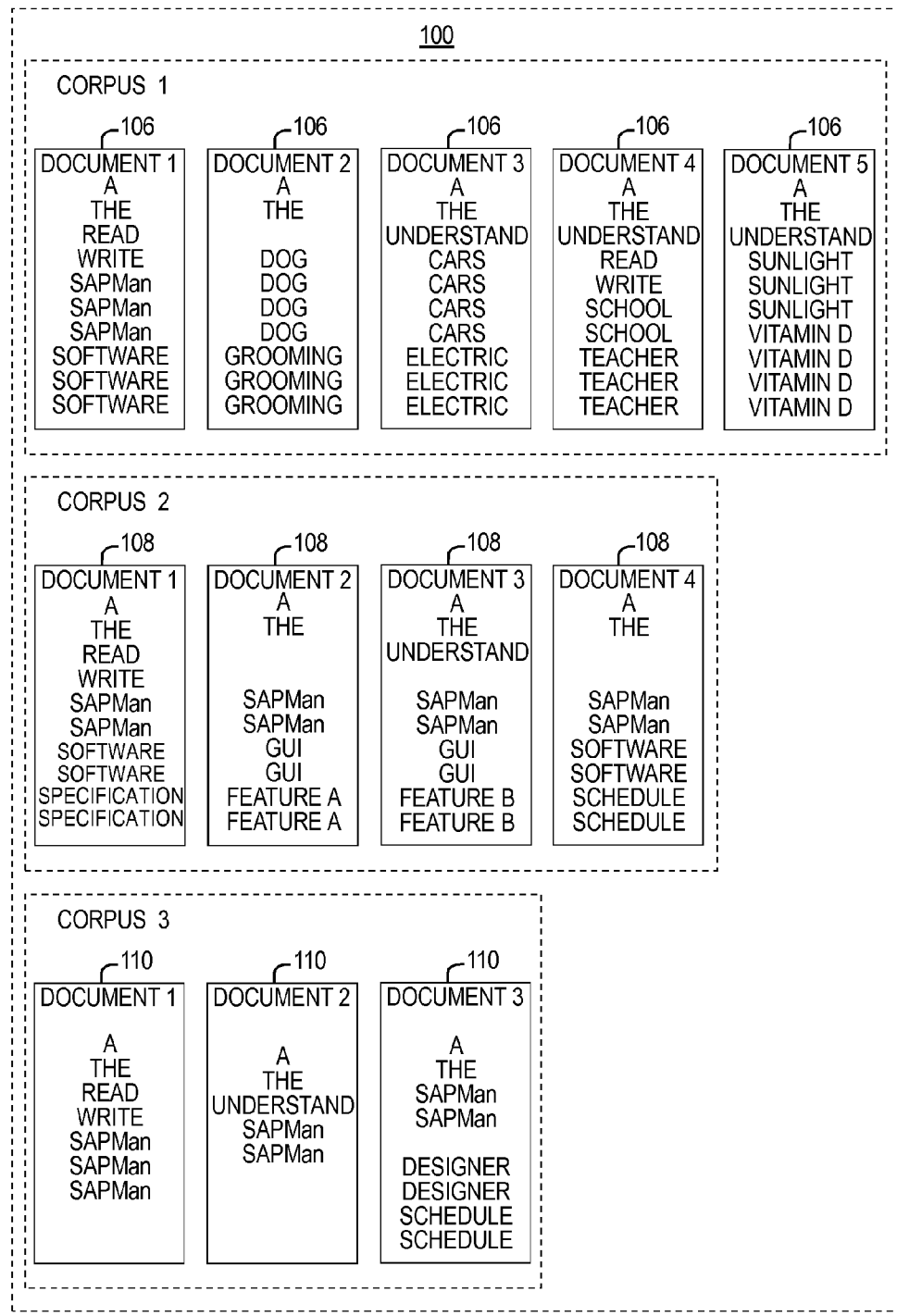
FIG. 2 is a representation of data in the system, in accordance with some embodiments.

FIG. 2 is a representation 200 of data that may be stored as representing the plurality of corpora in the system 100, in accordance with some embodiments.

Referring to FIG. 2, for purposes of illustration, the first corpus, CORPUS 1, is shown having a set of five documents: DOCUMENT 1, DOCUMENT 2, DOCUMENT 3, DOCUMENT 4 AND DOCUMENT 5. The second corpus, CORPUS 2, is shown having a set of four documents: DOCUMENT 1, DOCUMENT 2, DOCUMENT 3 AND DOCUMENT 4. The third corpus, CORPUS 3, is shown having a set of three documents: DOCUMENT 1, DOCUMENT 2 AND DOCUMENT 3.

Each document has a plurality of terms associated therewith. For example, a first document, DOCUMENT 1, of the first corpus, CORPUS 1, is shown associated with the following terms: A, THE, READ, WRITE, SAP Man and SOFTWARE. A second document, DOCUMENT 2, of the first corpus is shown associated with the following terms: A, THE, DOG and GROOMING. A third document, DOCUMENT 3, of the first corpus is shown associated with the following terms: A, THE, UNDERSTAND, CARS and ELECTRIC. A fourth document, DOCUMENT 4, of the first corpus is shown associated with the following terms: A, THE, UNDERSTAND, READ, WRITE, SCHOOL and TEACHER. A fifth document, DOCUMENT 5, of the first corpus is shown associated with the following terms: A, THE, UNDERSTAND, SUNLIGHT and VITAMIN D.

A first document, DOCUMENT 1, of the second corpus, CORPUS 2, is shown having the following terms associated therewith: A, THE, READ, WRITE, SAP Man, SOFTWARE and SPECIFICATION. A second document, DOCUMENT 2, of the second corpus is shown associated with the following terms: A, THE, SAP Man, GUI and FEATURE A. A third document, DOCUMENT 3, of the second corpus is shown associated with the following terms: A, THE, UNDERSTAND, SAP Man, GUI and FEATURE B. A fourth document, DOCUMENT 4, of the second corpus is shown associated with the following terms: A, THE, SAP Man, SOFTWARE and SCHEDULE.

And so on.

It should be understood that each corpus may have a greater or a smaller number of documents than is shown in FIG. 2. In some embodiments, for example, the first corpus, CORPUS 1, the second corpus, CORPUS 2, and the third corpus, CORPUS 3, will each have many more document that shown in FIG. 2.

It should be understood that the number of terms that are associated with any given document may be greater that or less than the number of terms that are shown associated with the documents in FIG. 2.

As stated above, in accordance with some embodiments, the system 100 has the ability to help capture reliable statistics for many words and special terms in a language, as if a generic corpus is used. This reduces the likelihood that a term with little semantic value in a general corpus will be under observed in a domain specific corpus and end up chosen as a keyword for each domain specific document in which it appears. In accordance with some embodiments, the system also has the ability to help prevent terms that frequently occur in a domain (i.e., "garbage" terms in the domain) from being chosen as keywords for documents in the domain, as if a domain specific corpus is used. This reduces the likelihood that a special term that appears in every, or almost every, internal document of an enterprise is chosen as a keyword for every internal document in which it appears.

Briefly, and as will be further described below, in accordance with some embodiments, the above is provided by using a plurality of different types of corpora (e.g., the first corpus, CORPUS 1, which may be a general corpus, the second corpus, CORPUS 2, which may be an enterprise-level corpus, and the third corpus, CORPUS 3, which may be employee-level corpus) to generate a plurality of inverse document frequency values for each term.

Rather than determine a term frequency-inverse document frequency value, tf-idf value, for a term t in a document d and a corpus C based on an single inverse document frequency value associated with a single corpus, the keyword extraction system 114 (and/or other portion of the system 100) determines an augmented term frequency-inverse document frequency value, an augmented tf-idf value, for the term t in the document d based on the plurality of inverse document frequency values, each of which is associated with a respective one of the plurality of different types of corpora.

In accordance with some embodiments, a preference (higher weighting) is given to one or more of the plurality of inverse document frequency values for a term. In particular, since an inverse document frequency value that is smaller in magnitude indicates that the term is less important (and potentially, a type of term that is sometimes referred to herein as a "garbage" term) in a corpus, and since an inverse document frequency value that is higher in magnitude may indicate that a term is under-observed in a small corpus, a preference may be given to one or more of the plurality of inverse document frequency values that are smaller in magnitude than the others. The preference (or other type of higher weighting) helps prevent terms that are "garbage" terms and terms that under-observed in a small corpus from being chosen as keywords for the documents in which they appear.

As will also be further described below, in accordance with some embodiments, the plurality of inverse document frequency values for a term are normalized to make them more properly comparable to one another. Normalization functions may be used in the normalization of the plurality of inverse document frequency values for a term. Each one of the normalization functions may be associated with a respect corpus.

In some embodiments, a normalization function associated with a corpus comprises a multiplicative factor (sometimes referred to herein as a normalization factor) that is to be multiplied by each inverse document frequency value associated with the corpus. The normalization factors may be based on inverse document frequency values computed (or determined in any other way) for predetermined reference terms, such as, for example, "read", "write" and "understand", with respect to each corpus.

In some embodiments, for example, a plurality of inverse document frequency values are determined for one of these reference terms, where each of the plurality of inverse document frequency values is associated with a respective corpus. Normalization factors may then be chosen, such that the product of (a) the inverse document frequency value associated with one corpus and (b) the normalization factor associated with that corpus, is equal to, the product of (c) the inverse document frequency value associated with another (i.e., a second) corpus and (d) the normalization factor associated with that second corpus.

However, other types of normalization functions may be used which may or may not use normalization factors.

In some embodiments, the preference given to one or more of the plurality of inverse document frequency values that is smaller in magnitude than the others may be implemented by choosing a minimum normalized inverse document frequency value from the plurality of normalized inverse document frequency values, as in equation (4) or by determining a geometric mean based on the plurality of normalized inverse document frequency values, as in equation (5):

$$idf(t) = \min_{k=1}^{m} N_k(idf_{C_k}(t)) \quad (4)$$

where idf(t) refers to a combined inverse document frequency value for a term
$C_k$ refers to a kth corpus
t refers to the term
d refers to the document
$idfc_k(t)$ refers to an inverse document frequency value for the term with respect to corpus $C_k$
$N_k$ refers to the normalization function for corpus $C_k$ and min refers to a minimum function
where m is the number of corpora used in determining the combined inverse document frequency value for the term.

$$idf(t) = N_k(\Pi_{k=1}^{m} N_k(idf_{C_k}(t))^{1/m} \quad (5)$$

where idf(t) refers to a combined inverse document frequency value for a term
$C_k$ refers to a kth corpus
t refers to the term
d refers to the document
$idfc_k(t)$ refers to an inverse document frequency value for the term with respect to corpus $C_k$ $N_k$ refers to the normalization function for corpus $C_k$
Π refers to a product function
where $()^{1/m}$ refers to an mth root and
where m is the number of corpora used in determining the combined inverse document frequency value for the term.

Figure 4:
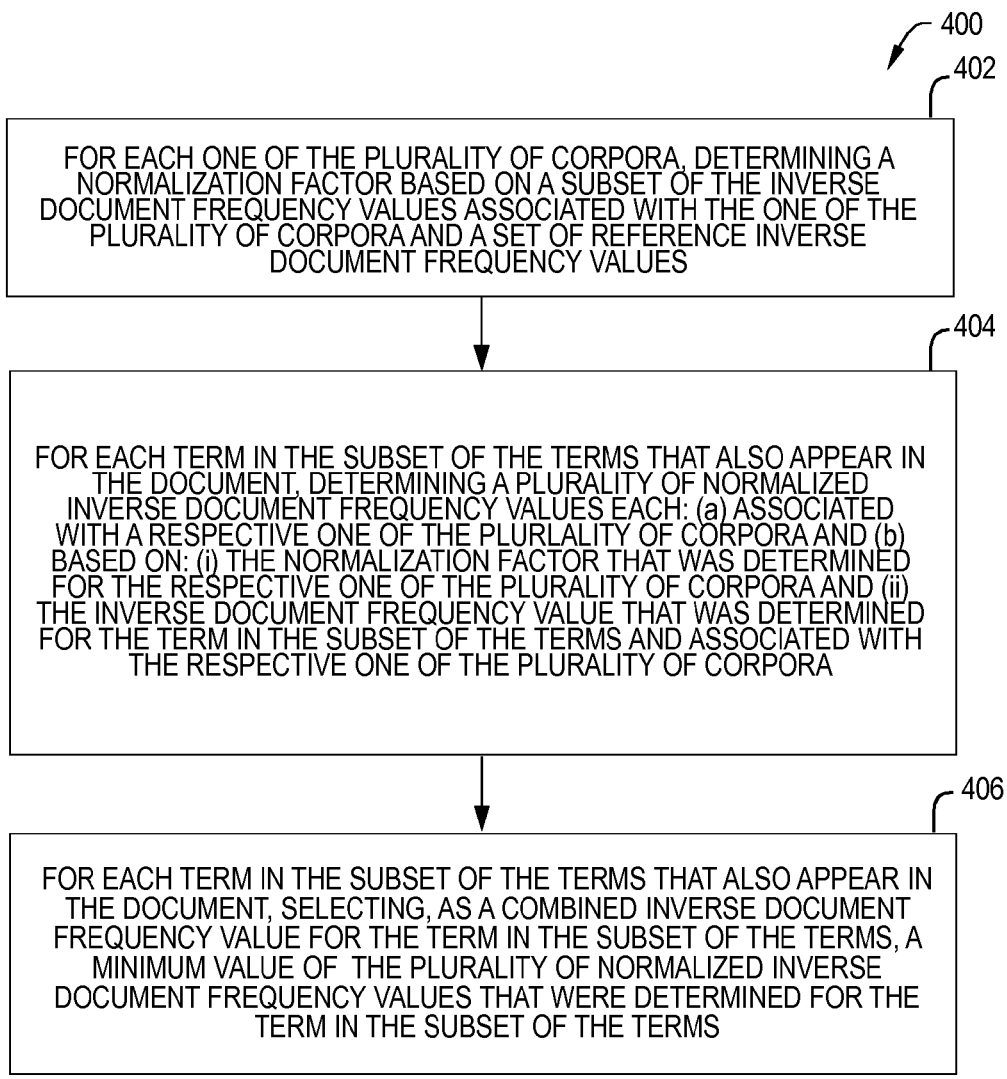
FIG. 4 is a flow chart of a method, in accordance with some embodiments.

In some embodiments, a combined inverse document frequency value in accordance with equation (4) may be determined using a method 400 shown FIG. 4.

Figure 5:
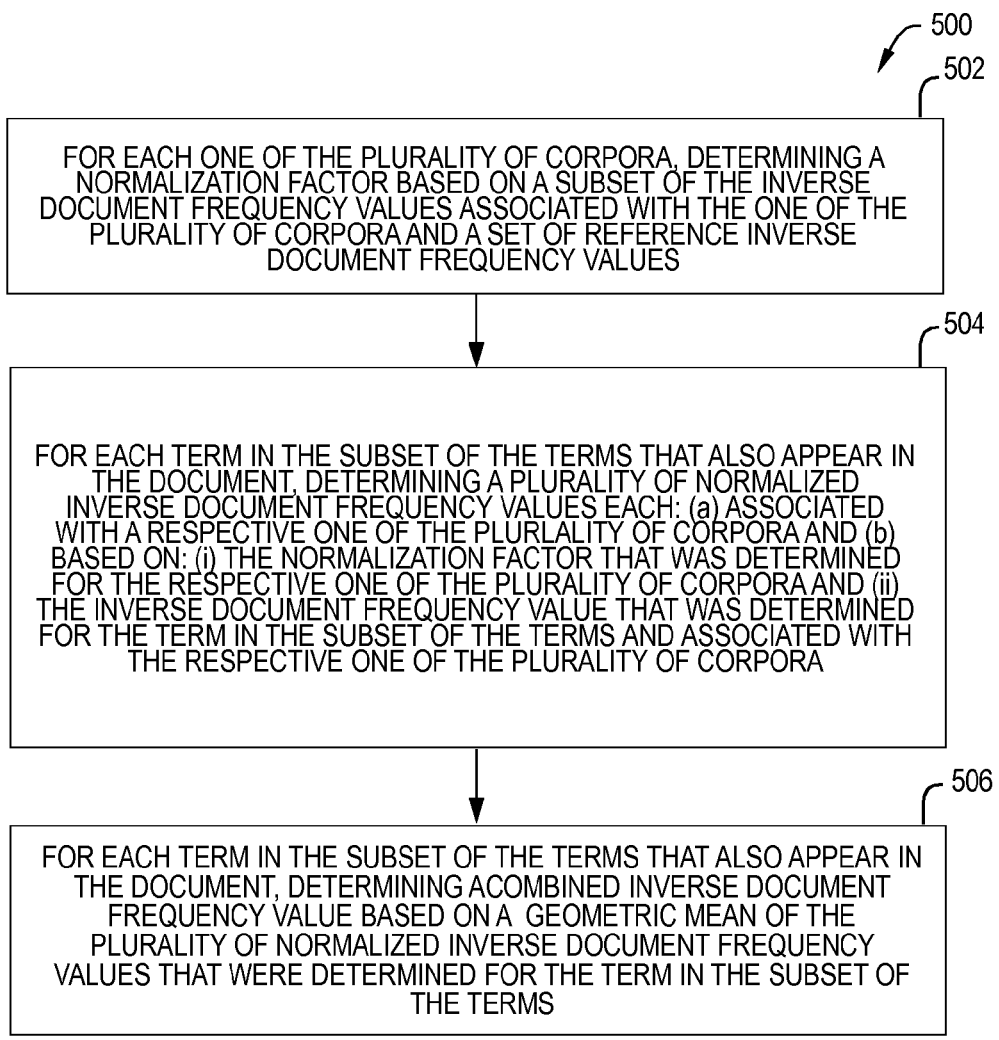
FIG. 5 is a flow chart of a method, in accordance with some embodiments.

In some embodiments, a combined inverse document frequency value in accordance with equation (5) may be determined using a method 500 shown FIG. 5.

An augmented term frequency-inverse document frequency value may be determined by multiplying the term frequency, tf, and the combined inverse document frequency value, augmented tf-idf value. Keywords for a document may be determined by comparing the augmented term frequency-inverse document inverse document frequency value, augmented tf-idf value, for each term in a document to a keyword threshold.

Although equations (4)-(5) make reference to a combined inverse document frequency value for a term, which may in turn be used to determine an augmented term frequency-inverse document frequency value for a term in a document, it should be understood that some embodiments may employ a different order of operations and thus may not determine a combined inverse document frequency value for a term prior to determining the augmented term frequency-inverse document frequency value for the term.

Figure 3:
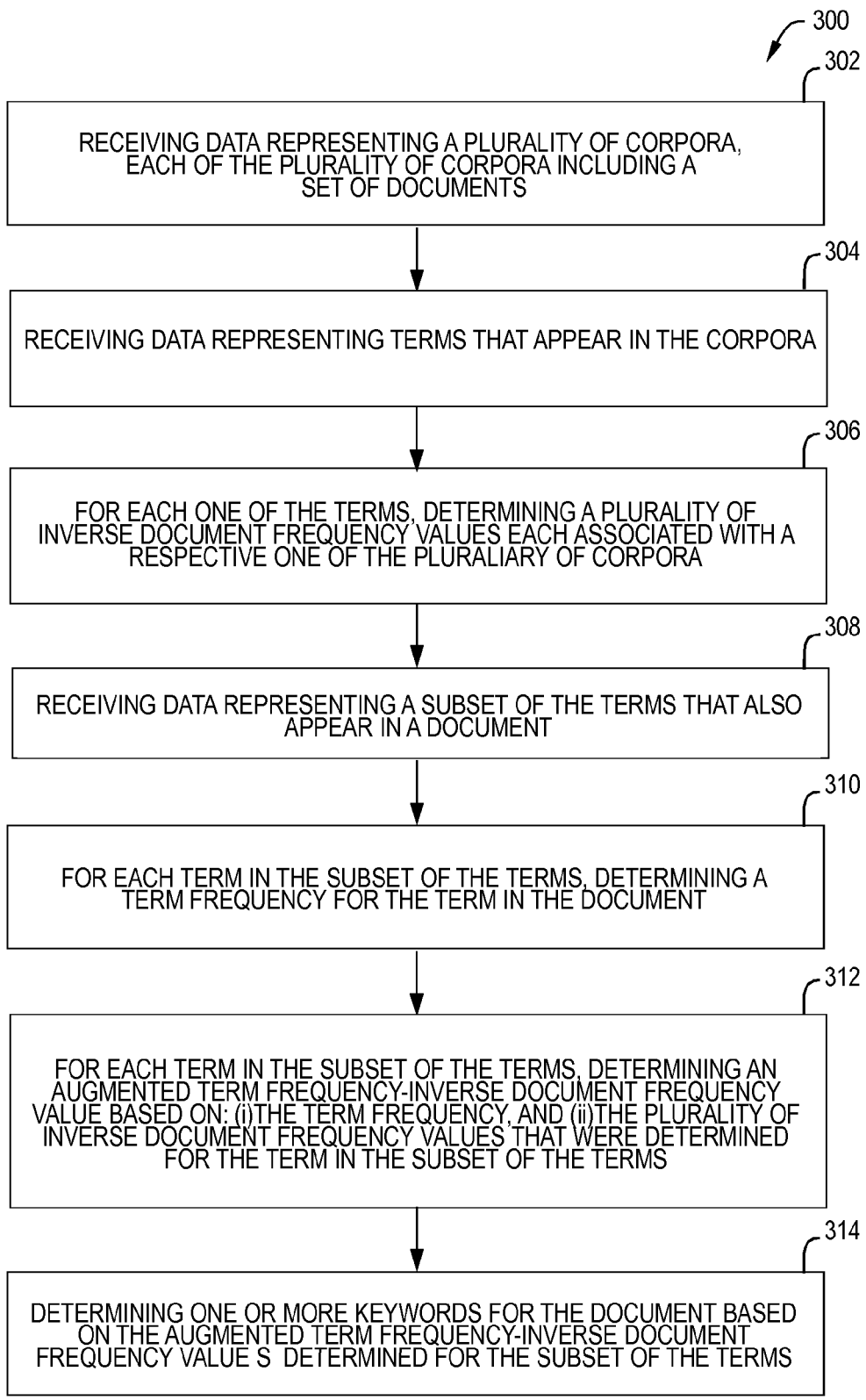
FIG. 3 is a flow chart of a method, in accordance with some embodiments.

FIG. 3 is a flow chart of a method 300 that may be used in determining one or more keywords for a document, in accordance with some embodiments.

In some embodiments, one or more portions of the method may be performed by one or more portions of the system 100.

In some embodiments, the method 300 has the ability to help capture reliable statistics for many words and special terms in a language, as if a generic corpus is used. This reduces the likelihood that a term with little semantic value in a general corpus will be under observed in a domain specific corpus and end up chosen as a keyword for each domain specific document in which it appears. In accordance with some embodiments, the method 300 also helps to prevent terms that frequently occur in a domain (i.e., "garbage" terms in the domain) from being chosen as keywords for documents in the domain, as if a domain specific corpus is used. This reduces the likelihood that a special term that appears in every, or almost every, internal document of an enterprise is chosen as a keyword for every internal document in which it appears.

Referring to FIG. 3, at 302, the method may include receiving, by a processing device, data representing a plurality of corpora, each of the plurality of corpora including a set of documents.

At 304, the method may further include receiving, by a processing device, data representing terms that appear in the corpora. In some embodiments, this may include extracting, from the corpora, the terms that appear in the corpora.

In accordance with some embodiments, each of the terms is normalized form of a word or words that appear in the corpora. For example the words "assume", "assuming" and "assumed" may be normalized to the term "assume". In some embodiments, non-normalized words appearing in the corpora must be processed in order to identify the corresponding normalized terms. By employing normalized terms, the statistics described herein will be based on normalized terms, rather than non-normalized words.

At 306, the method may further include, for each one of the terms, determining, by a processing device, a plurality of inverse document frequency values each associated with a respective one of the plurality of corpora. In some embodiments, each of the plurality of inverse document frequency values that is determined for the one of the terms is inversely proportional to a count of documents that are in the respective one of the plurality of corpora and include the one of the terms.

At 308, the method may further include, receiving, by a processing device, data representing a subset of the terms that also appear in a document. In some embodiments, this may comprise extracting, from the document, the subset of the terms that also appear in the document.

At 310, the method may further include, for each term in the subset of the terms, determining, by a processing device, a term frequency for the term in the document.

In some embodiments, this is performed by retrieving the term frequency from data that has already been received. For example, in some embodiments, data representing the term frequency is received along with the data representing the subset of the terms that also appear in the document at 308.

At 312, the method may further include, for each term in the subset of the terms, determining, by a processing device, an augmented term frequency-inverse document frequency value based on: (i) the term frequency, and (ii) the plurality of inverse document frequency values that were determined for the term in the subset of the terms. In some embodiments, a preference (higher weighting) is given to one or more of the plurality of inverse document frequency values for a term.

At 314, the method may further include, determining, by a processing device, one or more keywords for the document based on the augmented term frequency-inverse document frequency values determined for the subset of the terms.

In some embodiments, the above comprises, for each term in the subset of the terms, determining if the term in the subset of the terms is a keyword for the document by comparing the augmented term frequency-inverse document frequency value for the term in the subset of the terms to a keyword threshold.

It should be noted that the method 300 is not limited to the order shown in the flow chart. Rather, embodiments of the method 300 may be performed in any order that is practicable. For that matter, unless stated otherwise, any method disclosed herein may be performed in any order that is practicable. Notably, some embodiments may employ one or more portions of a method without one or more other portions of the method.

It should also be noted that the method 300 and/or any other method described herein may be performed by hardware, software (which may include low level language code and/or high language code) or any combination thereof.

It should also be noted that in some embodiments, a non-transitory computer readable medium may have instructions stored thereon, which if executed by a machine result in performance of the method 300 (or one or more portions thereof) and/or any other method (or portion thereof) described herein.

FIG. 4 is a flow chart of a method 400, in accordance with some embodiments.

In some embodiments, the method 400 may be used in determining a combined inverse document frequency value in accordance with definition (4) set forth above.

In some embodiments, the combined inverse document frequency value may be used in determining the augmented term frequency-inverse document frequency value in method 300.

Referring to FIG. 4, at 402, the method may include for each one of the plurality of corpora, determining, by a processing device, a normalization factor based on a subset of the inverse document frequency values associated with the one of the plurality of corpora and a set of reference inverse document frequency values.

In some embodiments, the normalization factors may be based on inverse document frequency values computed for predetermined reference terms, such as, for example, "read", "write" and "understand", and with respect to each corpus.

At 404, the method may further include, for each term in the subset of the terms that also appear in the document, determining a plurality of normalized inverse document frequency values each: (a) associated with a respective one of the plurality of corpora and (b) based on: (i) the normalization factor that was determined for the respective one of the plurality of corpora and (ii) the inverse document frequency value that was determined for the term in the subset of the terms and associated with the respective one of the plurality of corpora.

At 406, the method may further include, for each term in the subset of the terms that also appear in the document, selecting, as a combined inverse document frequency value for the term in the subset of the terms, a minimum value of the plurality of normalized inverse document frequency values that were determined for the term in the subset of the terms.

FIG. 5 is a flow chart of a method 500, in accordance with some embodiments.

In some embodiments, the method 500 may be used in determining a combined inverse document frequency value in accordance with definition (5) set forth above.

In some embodiments, the combined inverse document frequency value may be used in determining the augmented term frequency-inverse document frequency value in method 300.

Referring to FIG. 5, at 502, the method may include for each one of the plurality of corpora, determining, by a processing device, a normalization factor based on a subset of the inverse document frequency values associated with the one of the plurality of corpora and a set of reference inverse document frequency values.

At 504, the method may further include, for each term in the subset of the terms that also appear in the document, determining a plurality of normalized inverse document frequency values each: (a) associated with a respective one of the plurality of corpora and (b) based on: (i) the normalization factor that was determined for the respective one of the plurality of corpora and (ii) the inverse document frequency value that was determined for the term in the subset of the terms and associated with the respective one of the plurality of corpora.

At 506, the method may further include, for each term in the subset of the terms that also appear in the document, determining a combined inverse document frequency value based on a geometric mean (such as, for example, using equation (5)) of the plurality of normalized inverse document frequency values that were determined for the term in the subset of the terms.

Some embodiments use one or more other schemes for combining the plurality of inverse document values to achieve one or more of the desired features that are sets forth above.

As stated above, it has also been determined that if the number of documents in a corpus is relatively small, the log function in the determination of the inverse document frequency, idf, for a term in the corpus, may be too "aggressive", and may thereby decrease the accuracy of keyword extraction. For example, by using the log function, terms that occur in much different numbers of documents in the corpus, may end up with inverse document frequency values, idf values, that are almost identical to one another, and as a result, the inverse document frequency values, idf values, may not help differentiate a term that is more important from a term that is less important.

In accordance with some embodiments, the above is addressed by selecting the function for the determination of the inverse document frequency value based upon the size of the corpus. In some embodiments, for example, if a corpus has a size of less than 10000 documents, a square root function may be used instead of the log function. In some embodiments, the selection is automated, and based on the notion of a test set—a predefined set of documents and their human-chosen keywords.

Thus, in accordance with some embodiments, each inverse document frequency value, idf value, may be determined as follows:

$$idf_C(t) = f_{|C|}\left(\frac{|C|}{1 + |\{d \in C : t \text{ is in } d\}|}\right), f_{|C|} \in \{\log, sroot, \ldots\} \quad (6)$$

where C refers to the corpus
t refers to the term and
d refers to a document in the corpus.

Figure 6:
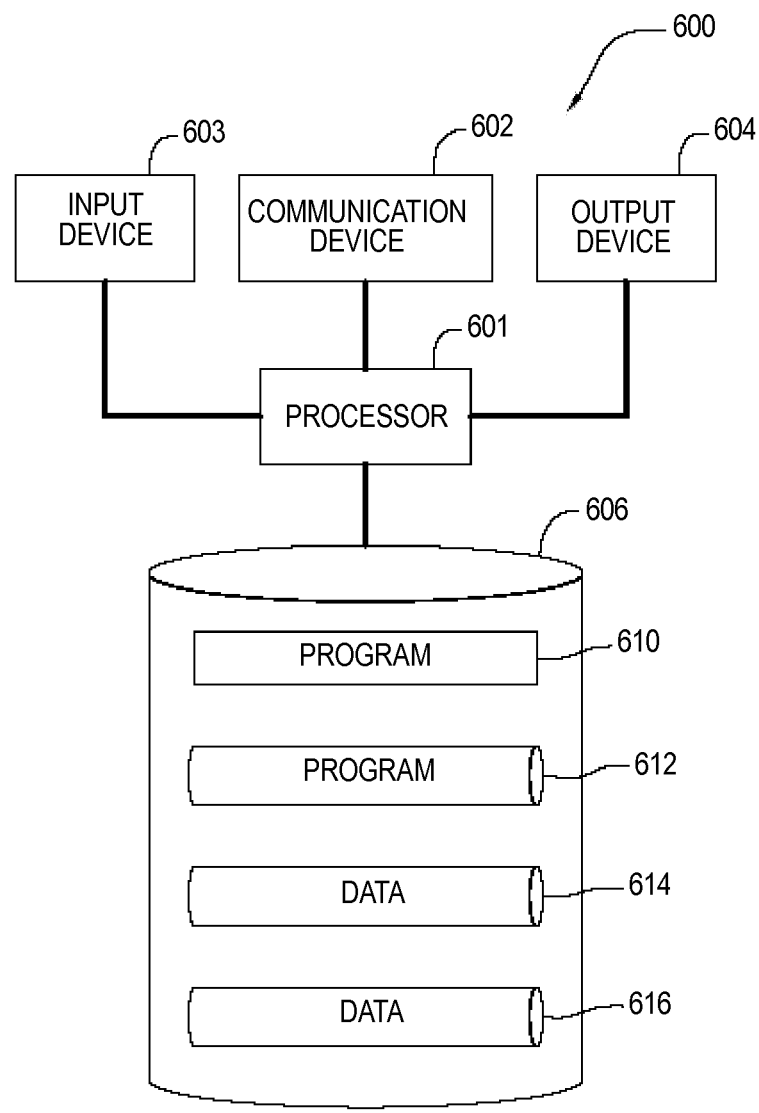
FIG. 6 is a block diagram of an architecture, in accordance with some embodiments.

FIG. 6 is a block diagram of an architecture 600 according to some embodiments. In some embodiments, one or more of the systems and/or devices (and/or portion(s) thereof) disclosed herein may have an architecture that is the same as and/or similar to one or more portions of the architecture 600.

In some embodiments, one or more of the methods (or portion(s) thereof) disclosed herein may be performed by a system, apparatus and/or device having an architecture that is the same as or similar to the architecture 600 (or portion(s) thereof).

The architecture may be implemented as a distributed architecture or a non distributed architecture. A distributed architecture may be a completely distributed architecture or a partly distributed-partly non distributed architecture.

Referring to FIG. 6, in accordance with some embodiments, the architecture 600 includes a processor 601 operatively coupled to a communication device 602, an input device 603, an output device 604 and a storage device 606, each of which may be distributed or non distributed.

In some embodiments, the processor 601 may execute processor-executable program code to provide one or more portions of the one or more functions disclosed herein and/or to carry out one or more portions of one or more embodiments of one or more methods disclosed herein. In some embodiments, the processor 601 may be a conventional microprocessor or microprocessors.

The communication device 602 may be used to facilitate communication with other devices and/or systems. In some embodiments, communication device 602 may be configured with hardware suitable to physically interface with one or more external devices and/or network connections. For example, communication device 602 may comprise an Ethernet connection to a local area network through which architecture 600 may receive and transmit information over the Internet and/or one or more other network(s).

The input device 603 may comprise, for example, one or more devices used to input data and/or other information, such as, for example: a keyboard, a keypad, track ball, touchpad, a mouse or other pointing device, a microphone, knob or a switch, an infra-red (IR) port, etc. The output device 604 may comprise, for example, one or more devices used to output data and/or other information, such as, for example: an IR port, a display, a speaker, and/or a printer, etc.

The storage device 606 may comprise, for example, one or more storage devices, such as, for example, magnetic storage devices (e.g., magnetic tape and hard disk drives), optical storage devices, and/or semiconductor memory devices such as Random Access Memory (RAM) devices and Read Only Memory (ROM) devices.

The storage device 606 may store one or more programs 610-612 and/or other information for operation of the architecture 600. In some embodiments, the one or more programs 610-612 include one or more instructions to be executed by the processor 601 to provide one or more portions of one or more functions and/or one or more portions of one or more methods disclosed herein. In some embodiments, the one or more programs 610-612 include one or more operating systems, database management systems, other applications, other information files, etc., for operation of the architecture 600.

The storage device 606 may store one or more databases 614-616 and/or criteria for one or more programs. As used herein a "database" may refer to one or more related or unrelated databases. Data and/or other information may be stored in any form. In some embodiments, data and/or other information may be stored in raw, excerpted, summarized and/or analyzed form.

In some embodiments, one or more portions of one or more embodiments disclosed herein may be embodied in a method, an apparatus, a system, a computer program product, and/or an article where the computer program product and/or the article includes a machine readable storage medium with instructions stored thereon. As used herein, a machine may be any type of machine. In some embodiments, a machine comprises a computer.

The term "computer" should be understood to include one computer or two or more cooperating computers. Similarly, the term "processor" should be understood to include one processor or two or more cooperating processors. The term "memory" should be understood to encompass a single memory or storage device or two or more memories or storage devices.

Unless stated otherwise, a processor may comprise any type of processor. For example, a processor may be programmable or non programmable, general purpose or special purpose, dedicated or non dedicated, distributed or non distributed, shared or not shared, and/or any combination thereof. A processor may include, but is not limited to, hardware, software, firmware, and/or any combination thereof. Hardware may include, but is not limited to off the shelf integrated circuits, custom integrated circuits and/or any combination thereof. In some embodiments, a processor comprises a microprocessor. Software may include, but is not limited to, instructions that are storable and/or stored on a computer readable medium, such as, for example, magnetic or optical disk, magnetic or optical tape, CD-ROM, DVD, RAM, EPROM, ROM or other semiconductor memory. A processor may employ continuous signals, periodically sampled signals, and/or any combination thereof. If a processor is distributed, two or more portions of the control/storage circuitry may communicate with one another through a communication link.

A processing device should be understood to include a processor.

As used herein, a signal may be any type of signal, i.e., a physical quantity (e.g., voltage, current, or magnetic field), an indication, a message and/or any other type of signal or combination thereof.

Unless otherwise stated, terms such as, for example, "in response to" and "based on" mean "in response at least to" and "based at least on", respectively, so as not to preclude being responsive to and/or based on, more than one thing.

In addition, unless stated otherwise, terms such as, for example, "comprises", "has", "includes", and all forms thereof, are considered open-ended, so as not to preclude additional elements and/or features. In addition, unless stated otherwise, terms such as, for example, "a", "one", "first", are considered open-ended, and do not mean "only a", "only one" and "only a first", respectively. Moreover, unless stated otherwise, the term "first" does not, by itself, require that there also be a "second".

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method comprising:
   receiving, by a processing device, data representing a plurality of corpora, each of the plurality of corpora including a set of documents;
   receiving, by a processing device, data representing terms that appear in the corpora;
   for each one of the terms, determining, by a processing device, a plurality of inverse document frequency values each associated with a respective one of the plurality of corpora;
   receiving, by a processing device, data representing a subset of the terms that also appear in a document;
   for each term in the subset of the terms, determining, by a processing device, a term frequency for the term in the document;
   for each term in the subset of the terms, determining, by a processing device, an augmented term frequency-inverse document frequency value based on: (i) the term frequency, and (ii) the plurality of inverse document frequency values that were determined for the term in the subset of the terms; and
   for each term in the subset of the terms that also appear in the document, selecting, by a processing device, as a combined inverse document frequency value, a minimum value of a plurality of normalized inverse document frequency values determined for the term in the subset of the terms.

2. The method of claim 1, further comprising determining, by a processing device, one or more keywords for the document based on the augmented term frequency-inverse document frequency values determined for the subset of the terms.

3. The method of claim 1, wherein the determining, for each one of the terms, a plurality of inverse document frequency values each associated with a respective one of the plurality of corpora comprises:
   determining, for each one of the terms, a plurality of inverse document frequency values each associated with a respective one of the plurality of corpora and inversely proportional to a count of documents that are in the respective one of the plurality of corpora and include the one of the terms.

4. The method of claim 1, further comprising, for each one of the plurality of corpora, determining, by a processing device, a normalization factor based on a subset of the inverse document frequency values associated with the one of the plurality of corpora and a set of reference inverse document frequency values.

5. The method of claim 4, further comprising:
   for each term in the subset of the terms that also appear in the document, determining, by a processing device, the plurality of normalized inverse document frequency values each: (a) associated with a respective one of the plurality of corpora and (b) based on:
   (i) the normalization factor that was determined for the respective one of the plurality of corpora and (ii) the inverse document frequency value determined for the term in the subset of the terms and associated with the respective one of the plurality of corpora.

6. The method of claim 5, further comprising:
   for each term in the subset of the terms that also appear in the document, determining, by a processing device, a combined inverse document frequency value based on a geometric mean of the plurality of normalized inverse document frequency values that were determined for the term in the subset of the terms.

7. A non-transitory computer readable storage medium having instructions stored thereon, the instructions being executable by a machine to result in a method comprising:
   receiving data representing a plurality of corpora, each of the plurality of corpora including a set of documents;
   receiving data representing terms that appear in the corpora;
   for each one of the terms, determining a plurality of inverse document frequency values each associated with a respective one of the plurality of corpora;
   receiving data representing a subset of the terms that also appear in a document;
   for each term in the subset of the terms, determining a term frequency for the term in the document;
   for each term in the subset of the terms, determining, an augmented term frequency-inverse document frequency value based on: (i) the term frequency, and (ii) the plurality of inverse document frequency values that were determined for the term in the subset of the terms; and
   for each term in the subset of the terms that also appear in the document, selecting, by a processing device, as a combined inverse document frequency value, a minimum value of a plurality of normalized inverse document frequency values determined for the term in the subset of the terms.

8. The non-transitory computer readable medium of claim 7, the method further comprising:
   determining, by a processing device, one or more keywords for the document based on the augmented term frequency-inverse document frequency values determined for the subset of the terms.

9. The non-transitory computer readable medium of claim 7, wherein the determining, for each one of the terms, a plurality of inverse document frequency values each associated with a respective one of the plurality of corpora comprises:
   determining, for each one of the terms, a plurality of inverse document frequency values each associated with a respective one of the plurality of corpora and inversely proportional to a count of documents that are in the respective one of the plurality of corpora and include the one of the terms.

10. The non-transitory computer readable medium of claim 7, the method further comprising:
for each one of the plurality of corpora, determining a normalization factor based on a subset of the inverse document frequency values associated with the one of the plurality of corpora and a set of reference inverse document frequency values.

11. The non-transitory computer readable medium of claim 10, the method further comprising:
for each term in the subset of the terms that also appear in the document, determining the plurality of normalized inverse document frequency values each: (a) associated with a respective one of the plurality of corpora and (b) based on: (i) the normalization factor that was determined for the respective one of the plurality of corpora and (ii) the inverse document frequency value determined for the term in the subset of the terms and associated with the respective one of the plurality of corpora.

12. The non-transitory computer readable medium of claim 11, the method further comprising:
for each term in the subset of the terms that also appear in the document, determining a combined inverse document frequency value based on a geometric mean of the plurality of normalized inverse document frequency values that were determined for the term in the subset of the terms.

13. A system comprising:
a processing device to receive data representing a plurality of corpora, each of the plurality of corpora including a set of documents;
a processing device to receive data representing terms that appear in the corpora;
a processing device to determine, for each one of the terms, a plurality of inverse document frequency values each associated with a respective one of the plurality of corpora;
a processing device to receive data representing a subset of the terms that also appear in a document;
a processing device to determine, for each term in the subset of the terms, a term frequency for the term in the document;
a processing device to determine, for each term in the subset of the terms, an augmented term frequency-inverse document frequency value based on: (i) the term frequency, and (ii) the plurality of inverse document frequency values that were determined for the term in the subset of the terms; and
a processing device to determine, for each term in the subset of the terms that also appear in the document, selecting, by a processing device, as a combined inverse document frequency value, a minimum value of a plurality of normalized inverse document frequency values determined for the term in the subset of the terms.

14. The system of claim 13, further comprising:
a processing device to determine one or more keywords for the document based on the augmented term frequency-inverse document frequency values determined for the subset of the terms.

15. The system of claim 13, wherein the determine, for each one of the terms, a plurality of inverse document frequency values each associated with a respective one of the plurality of corpora comprises:
determine, for each one of the terms, a plurality of inverse document frequency values each associated with a respective one of the plurality of corpora and inversely proportional to a count of documents that are in the respective one of the plurality of corpora and include the one of the terms.

16. The system of claim 13, further comprising:
a processing device to determine, for each one of the plurality of corpora, a normalization factor based on a subset of the inverse document frequency values associated with the one of the plurality of corpora and a set of reference inverse document frequency values.

17. The system of claim 16, further comprising:
a processing device to determine, for each term in the subset of the terms that also appear in the document, the plurality of normalized inverse document frequency values each: (a) associated with a respective one of the plurality of corpora and (b) based on: (i) the normalization factor that was determined for the respective one of the plurality of corpora and (ii) the inverse document frequency value determined for the term in the subset of the terms and associated with the respective one of the plurality of corpora.

* * * * *